United States Patent [19]

Lian et al.

[11] Patent Number: 6,106,969
[45] Date of Patent: Aug. 22, 2000

[54] ENERGY DEVICES WITH MEANS FOR FAILURE DETECTION

[75] Inventors: Ke Keryn Lian, Palatine; Han Wu, Barrington, both of Ill.

[73] Assignee: Motorola, Inc., Schaumburg, Ill.

[21] Appl. No.: 09/087,889

[22] Filed: May 31, 1998

[51] Int. Cl.$^7$ .................................................. H01M 10/48
[52] U.S. Cl. ............................................................ 429/90
[58] Field of Search ................................ 429/90; 73/49.3; 206/703, 704, 705

[56] References Cited

U.S. PATENT DOCUMENTS

| | | |
|---|---|---|
| 2,460,215 | 1/1949 | Chase . |
| 3,903,309 | 9/1975 | Mahaffy et al. . |
| 4,049,121 | 9/1977 | White ........................................ 206/439 |
| 4,222,745 | 9/1980 | Cloyd ..................................... 429/90 X |
| 4,723,656 | 2/1988 | Kiernan et al. ...................... 429/100 X |
| 5,188,231 | 2/1993 | Kivell et al. ............................. 206/333 |
| 5,389,458 | 2/1995 | Weiss et al. ............................... 429/90 |
| 5,831,148 | 11/1998 | Marshall ............................... 429/90 X |

FOREIGN PATENT DOCUMENTS

| | | |
|---|---|---|
| 55-86072 | 6/1980 | Japan . |
| 2164200 | 3/1986 | United Kingdom . |

*Primary Examiner*—Stephen Kalafut
*Attorney, Agent, or Firm*—Felipe Farley; Philip H. Burrus, IV

[57] ABSTRACT

An article comprised of a material that can be wetted by electrolyte solutions contains indicator substances sensitive to acid, caustic and or salt solutes that are present in said electrolyte solutions: said articles are employed as whole or partial encapsulation for devices, especially electrochemical cells, and thereby provide an enhanced alerting function for electrolyte leaks and spills.

1 Claim, 3 Drawing Sheets

ENERGY DEVICES WITH MEANS FOR FAILURE DETECTION

TECHNICAL FIELD

This invention relates in general to the fields of packaging materials and sensors, and in particular to means for detecting failures in electrochemical cells.

BACKGROUND OF THE INVENTION

As electronic devices increasingly become portable, advances must be made to guarantee the safety and reliability of portable energy storage systems. The industry emphasis on portability and long use times has resulted in large increases in energy storage capacity and or power output rates, quantities that correspond to the magnitude of potential hazards if a cell should fail or be abused. Therefore it is of mounting importance to have quality control mechanisms for assembly and handling of the energy storage device.

Numerous different battery systems have been proposed for use in portable applications over the years. Among the earliest were primary (i.e., non-rechargeable) alkaline cells. Early rechargeable battery systems included lead acid, and nickel cadmium (NiCad), each of which has enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications. In order to achieve high current rates, e.g. for digital pulse electronics applications, a new class of cells is also now emerging, generally referred to as electrochemical capacitors (ECC).

Higher voltage cell chemistries are evolving and finding a place in cell markets, the most prominent current example being lithium ion cells; these are for the most part non-aqueous. However, aqueous based systems such as lead acid, Nicad, NiMH, ECC, and primary alkaline cells continue to be popular among consumers. Cell manufacturers continue to look for ways to improve the quality of these aqueous based cells as well as more advanced cells, and to detect defective cells either during manufacturing or at later points. Leaks often correlate with a variety of internal cell malfunctions, including transient short circuits in cells, high self-discharge, corrosion of tabs and current collectors, failure to pass current, and in addition electrolyte frequently damage the electrical devices for which they were intended to provide power. Cells that have suffered substantial leaks often are coated with a powdery residue, comprised of base, acid, and or salt that had been dissolved in the leaked electrolyte solution. However, such deposits may also result from the leak of a neighboring cell. For many purposes visual observation of residues is considered a crude, time consuming, and somewhat unreliable test, and one would prefer to have a method that would determine immediately which, if any, cells in a lot had leaked.

Accordingly, there exists a need for improved means of indicating electrolyte leaks.

DETAILED DESCRIPTION OF THE PREFERRED EMBODIMENT

Figure 1:
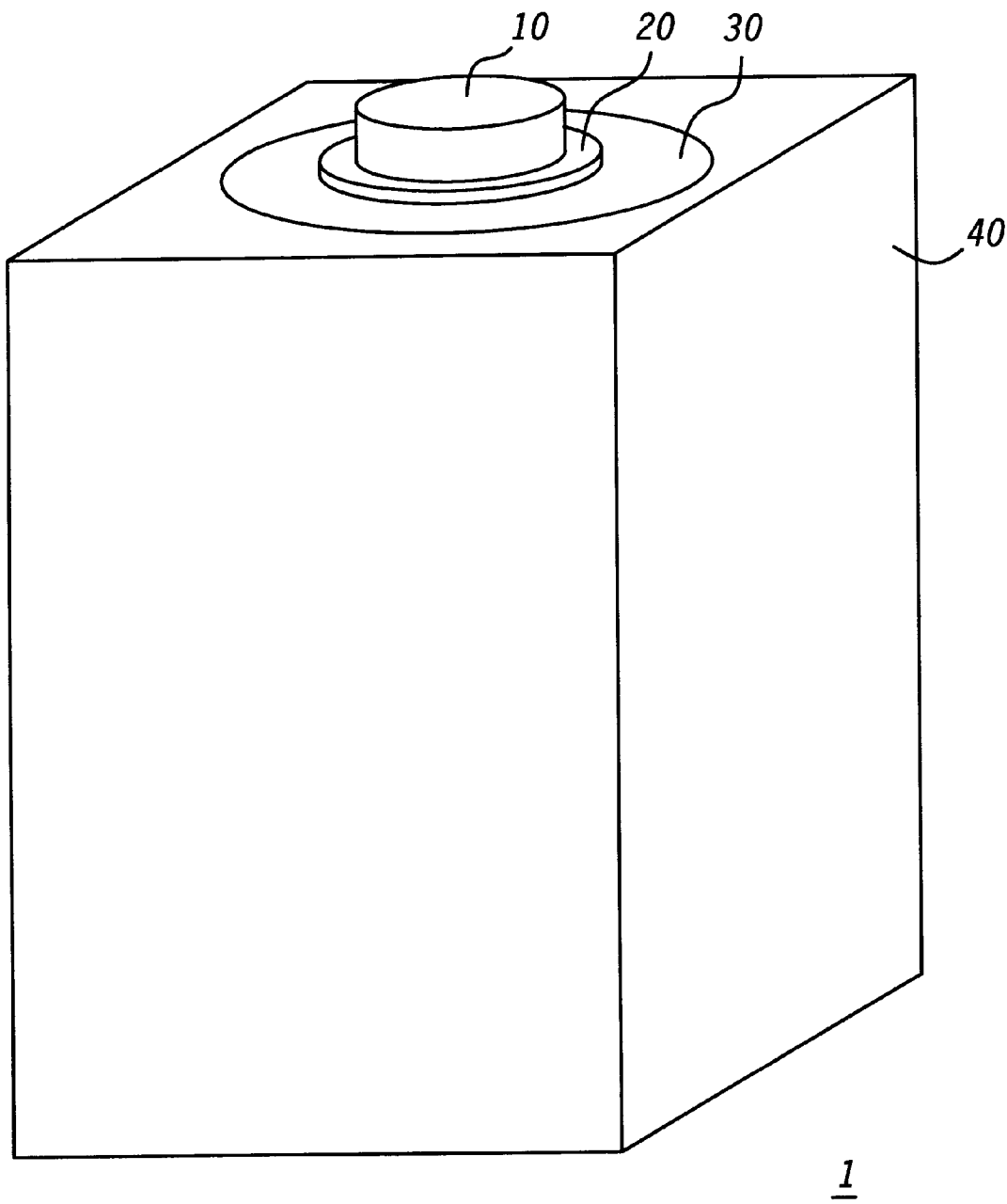
FIG. 1 is a schematic representation of a prismatic cell (1) fabricated according to the present invention and containing alkaline electrolyte within. The positive electrical contact (10) is a nipple, isolated electrically from the negative electrical contact (the prismatic can, 40) by a gasket (20) which is configured to permit venting of gases and or the liquid electrolyte, such as is common in prismatic rechargeable cells. A collar (30) comprised of an indicator substance circumscribes the vent area such that it serves as a diagnostic if the vent should release liquid electrolyte.
Figure 2:
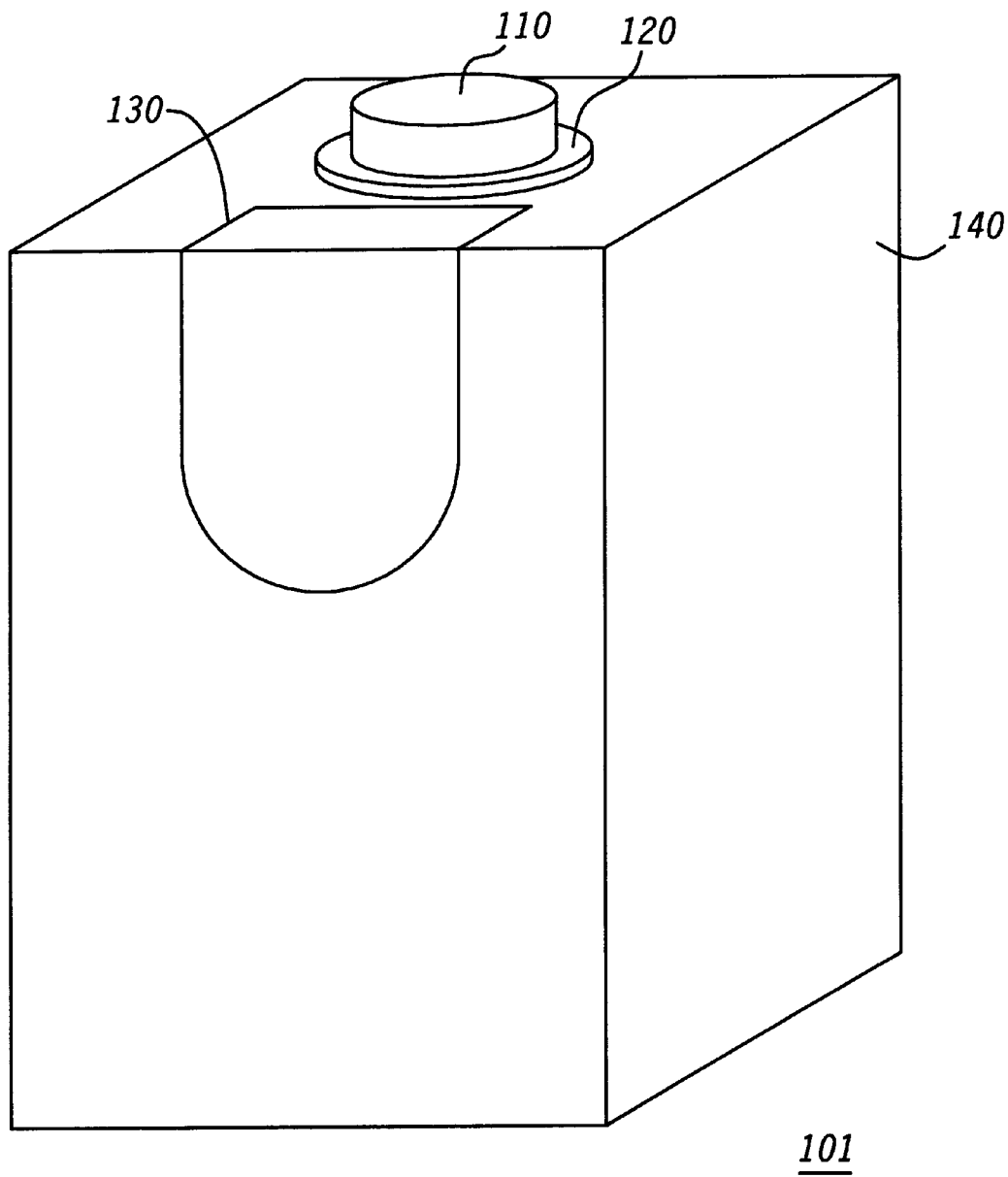
FIG. 2 is a schematic representation of a prismatic cell (101) fabricated according to the present invention and containing alkaline electrolyte within. The positive electrical contact (110) is a nipple, isolated electrically from the negative electrical contact (the prismatic can, 140) by a gasket (120) which is configured to permit venting of gases and or the liquid electrolyte, such as is common in prismatic rechargeable cells. An adhesive backed film (130) comprised of an indicator substance is placed as a sticker near the vent area such that it serves as a diagnostic if the vent should release liquid electrolyte.
Figure 3:
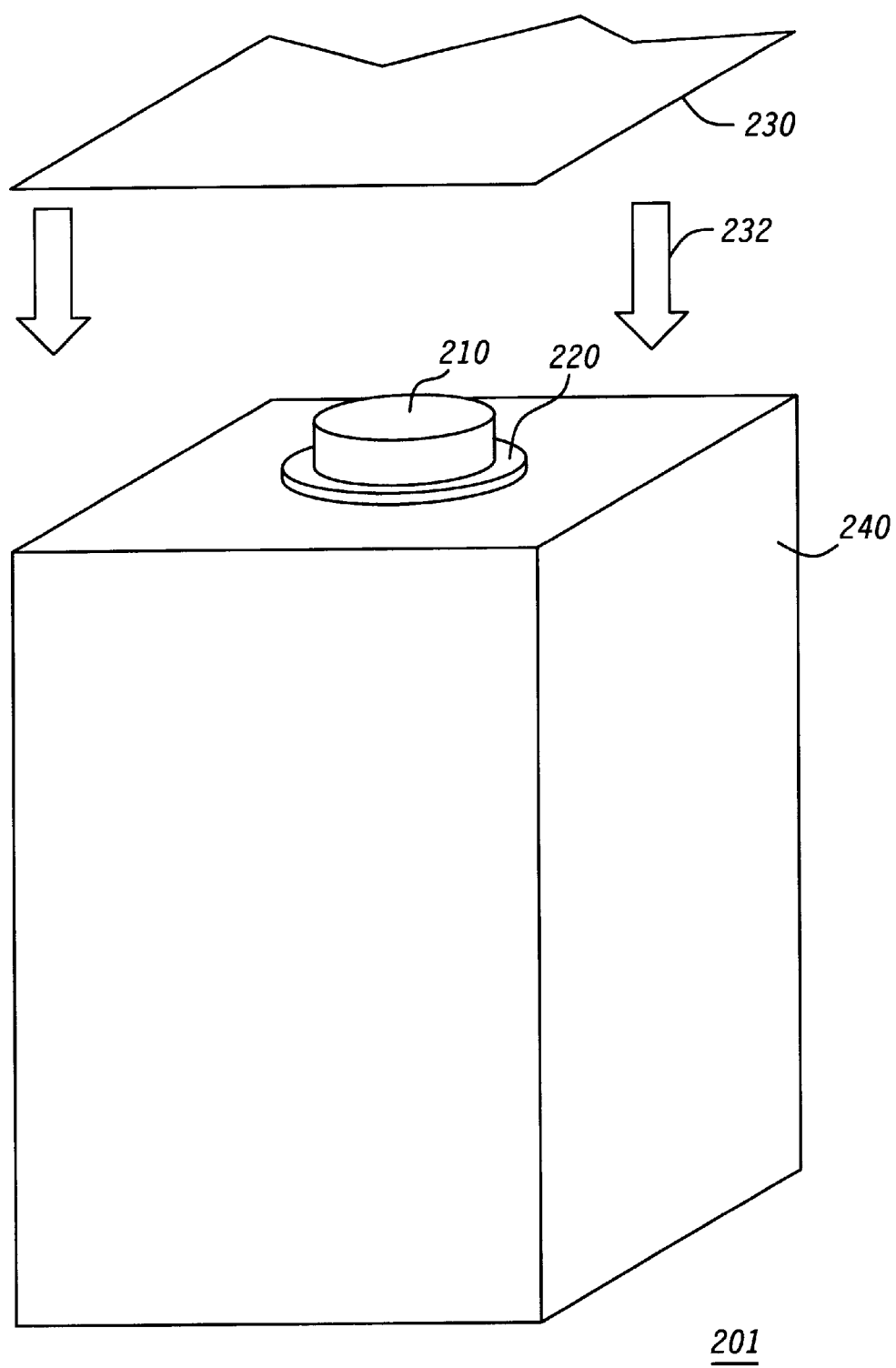
FIG. 3 is a schematic representation of a prismatic cell (201) fabricated according to the present invention and containing alkaline electrolyte within. The positive electrical contact (210) is a nipple, isolated electrically from the negative electrical contact (the prismatic can, 240) by a gasket (220) which is configured to permit venting of gases and or the liquid electrolyte, such as is common in prismatic rechargeable cells. A film (230) comprised of an indicator substance is bonded as a wrap over the vent area such that it serves as a diagnostic if the vent should release liquid electrolyte; arrows (e.g., 232) indicate the direction of application for the indicator pad onto the nipple and can. In cases where the indicator pad completely covers the electrical lead, it must provide for a means of electrical conduction from the nipple, either by an electrical lead that runs under or penetrates the indicator pad, or by some other means such as a localized electrically conductive spot in the pad in contact with the nipple (the configuration would be counterproductive if the indicator pad were to short circuit the nipple to the can).

The invention incorporates indicator substances in an article, said article being comprised of a material that can be wetted by acid, caustic, and or salt solutions. The acid, caustic and or salt solutes in these electrolyte solutions trigger a change in the indicator substance, such as a color change, a hue change, or a change such as an increase or loss in phosphorescent or fluorescent character, or may undergo easily detectable changes apparent under infrared or ultraviolet illumination. When said article is exposed to electrolyte solutions toward which the indicator substance is a sensor, the exposure can be detected by visible means. In many cases prior exposure to electrolyte is still positively indicated even after the liquid fraction of the electrolyte solution has evaporated. Thus the indicator mechanism may be useful for identifying defective electrochemical cell by means of electrolyte leaks that occurred at any point during manufacture, shipment, storage, or end use. In addition, said indicating article may be incorporated internally in a cell as a means of verifying that cells have been filled with electrolyte, or with the appropriate quality of electrolyte. An article comprising an indicator substance according to the instant invention may be employed as an encapsulating element for a cell, whether as the sole housing for a cell or as a component of a covering for a cell. For example, said article may entirely encapsulate the cell (an envelope around the cell). Alternatively, said article may partially encapsulate the cell: for example it may be treated with adhesive and placed on cell packaging material as a sensor, or may be employed as a patch covering a cell vent in order to maximize the article's exposure to vented liquid, or may be otherwise configured as a packaging element.

The wettability of the article by an electrolyte solution is important to the extent that ions from the solution must be able to diffuse to and react with the indicator substance, or alternatively diffuse to and react with other molecular species that can then activate the indicator substance. If the indicator substance is at the surface of the host medium for the indicator article, then the electrolyte need only to wet the surface of it. If the indicator substance is dispersed throughout the article, i.e., is not limited to a surface population, then it may be deemed important that solutes in the electrolyte can penetrate past the surface and that the article itself is at least partially transparent. In addition, depending upon the brilliance of color or light emissions of the indicator substance when activated, it may also be deemed important that except for the indicator component, the molecular composition of said article should be relatively colorless.

Table 1 lists some example indicators and the types of environments that they sense. However, the invention is not limited to these examples.

TABLE 1

| Indicator | Color Change with decreased PH | Applications |
| --- | --- | --- |
| 2,6-Dinitrophenol | yellow to colorless | for acid electrolyte |
| Bromphenol Blue | blue to yellow | for acid electrolyte |
| Methyl Orange | yellow to red | for acid electrolyte |
| Methyl Red | yellow to red | for acid electrolyte |
| Litmus | blue to red | for acid and alkaline electrolyte |
| Phenol Red | red to yellow | for acid and alkaline electrolyte |
| α-Naphtholphthalein | blue to yellow | for acid and alkaline electrolyte |
| Phenolphthalein | red to colorless | for acid and alkaline electrolyte |
| Thymolphthalein | blue to colorless | for alkaline electrolyte |
| 1,3,5-Trinitrobezene | orange to colorless | for alkaline electrolyte |

Even relatively low concentrations of indicator (e.g., <<1% by mass) can provide intense color upon exposure to concentrated solutions such as are found in electrolyte.

In many cases it is convenient to dope indicator substances into a soluble polymer or polymerizable monomer by solvent-casting from solution. Examples of suitable host media for comprising pH-sensing articles include water-soluble substances such as homopolymers or copolymers of the following: poly(ethylene oxide), poly(sodium 4-styrene sulfonate), polyacrylamide, and polyvinyl alcohol, though the invention is not so limited. Examples of suitable polymerizable monomers include metal salts of methyl methacrylate and of 4-styrenesulfonate, though again the invention is not so limited. Host polymers may also be cross-linked or anchored to a surface by covalent or ionic bonds in order to prevent them from being dissolved away upon being wetted. Celluloses, starches, and polysaccharide gums may also be employed as host media even where these are not fully soluble in water, for instance, by swelling formed films with aqueous solutions containing a dissolved indicator, then evaporating or boiling off the water. Other means for depositing such films include solution casting of water-based latex mixtures containing indicator substances.

While the host polymer examples just cited were described in final form as solvent-free, water-free systems, they could just as equally exist in plasticized or gel forms. An example of a suitable gel is a polyacrylamide films comprising equal masses of polymer and water. An example of a suitable plasticized polymer is poly(ethylene oxide) films comprising 20 mass % of triethylene glycol relative to the poly(ethylene oxide).

The indicator systems of the invention are not limited to the use of conventional pH indicators. For instance, one can employ safrole as an indicator either in its monomeric polymerized forms: upon exposure to aqueous acid, it gives up a formaldehyde molecule and generates a colorless hydroquinone that then oxidizes rapidly in air to achieve a dark color. Alternatively, polyaniline may be employed as an indicator: its coloration depends upon the acidity of its environment.

Non-aqueous indicator systems may comprise polymer hosts such as polyvinylidenefluoride, polyacrylonitrile, polyvinylchloride, polyvinylacetate, polyethylene oxide, polypropylene carbonate, as well as their copolymers. Non-aqueous indicators may comprise pigments such as chlorophyllin and its metal compounds, that change color upon chelating or exchanging an ion.

The invention meets the needs of a variety of types of applications. It is believed that the chief points of the invention may be better understood by a consideration of some examples.

EXAMPLE 1

A nickel metal hydride (NiMH) prismatic cell equipped with a vent is provided with an external collar comprised of a polyvinylalcohol film blended with 0.1 mass % phenolphthalein. The collar is placed around the nipple from which the cell is vented. When the cell suffers excessive internal heat or pressure such that caustic electrolyte is forced through the vent, the collar is wetted and undergoes a base-induced color change.

EXAMPLE 2

An electrochemical capacitor comprising bipolar alloy electrodes alternating with polybenzimidizole phosphoric acid gel electrolyte layers has the property of "dryness", that is, the phosphoric acid does not leach from one electrolyte layer to other electrolyte layers in the same cell. Said electrochemical capacitor is encapsulated in a film cast from an aqueous solution of 4 parts by weight polyethylene oxide (PEO, number average molecular weight 10 6), 1 part by weight triethylene glycol (TEG) as plasticizer, and 0.1 mass % (relative to the combined mass of the PEO and TEG) Phenol Red. The coloration of the encapsulating film indicates points at which said film contacts the edges of the acidic electrolyte layers. Manufacturing defects sometimes cause a streak of phosphoric acid gel to bridge different electrolyte layers of the same stack at the edges of the electrodes: this inadvertently short-circuits the respective cell layers together electrochemically by ion conductance, and the source of the short can be located by the color of the film sites directly adjacent to the ionic short-circuit path. Thus visual or calorimetric inspection of cells for quality assurance purposes is expedited.

From these examples it will be seen that a large number of novel and useful permutations may be derived, and that electrochemical cell applications that readily suggest themselves include battery cells, fuel cells, air cells, electrochemical capacitors, electrochromic cells, and solar cells.

Indeed, the use of the package as a sensor for leaks of base, acid, and or salt has ramifications far beyond use in electrochemical cells. One can, for instance, employ packaging materials doped with indicator substances for alerting handlers to spill hazards during storage and transportation of highly reactive chemicals, for instance sulfuric acid. Similarly, one may employ indicator-doped packaging for agricultural products such as fertilizers or pesticides: even in cases where the toxicity of salts leached from the packaged product may be small, detection of said salts by changes in the appearance of the indicator provides an indirect but valuable diagnostic alert that a medically or otherwise hazardous organic component of the same co-mixture has likely also leaked or been leached. While sensors and indicators (e.g., pH paper) have long been employed as discrete free-standing articles for analysis of chemical substances, we claim the use of packaging materials to perform that function in the service of leak detection is novel. Thus the scope of the invention includes all packaging applications that possess intrinsic electrolyte-sensing capabilities by virtue of being comprised of a host medium doped with an indicator substance.

The advantages of this approach will be recognized by those skilled in the art. It will be appreciated by now that there has been provided an improved method for monitoring the degree of success in electrolyte containment. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical cell comprising a packaging element that comprises an indicator substance which changes color upon exposure to electrolyte leaking from the cell;

in which the packaging element comprises a host medium selected from the group consisting of monomers, homopolymers and copolymers of the following: metal salts of methyl methacrylate, metal salts of 4-styrenesulfonate, and combinations thereof.

* * * * *